(12) United States Patent
Wursche et al.

(10) Patent No.: US 7,133,209 B2
(45) Date of Patent: Nov. 7, 2006

(54) TRANSPARENT MOLDING COMPOSITION FOR OPTICAL APPLICATIONS

(75) Inventors: Roland Wursche, Duelmen (DE); Dagmar Kaufhold, Recklinghausen (DE); Berthold Teloeken, Marl (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 10/784,712

(22) Filed: Feb. 24, 2004

(65) Prior Publication Data

US 2004/0166342 A1 Aug. 26, 2004

(30) Foreign Application Priority Data

Feb. 25, 2003 (DE) ................. 103 08 226

(51) Int. Cl.
G02B 3/00 (2006.01)
G02B 25/00 (2006.01)
G02B 1/04 (2006.01)
C08L 77/00 (2006.01)

(52) U.S. Cl. ............. 359/642; 428/474.4; 428/474.7; 428/474.9; 524/86; 524/94; 524/95; 524/115; 524/538

(58) Field of Classification Search ......... 428/474.4, 428/474.7, 474.9, 474.2; 524/86, 94, 95, 524/115, 538; 359/642
See application file for complete search history.

(56) References Cited

U.S. PATENT DOCUMENTS

| | | | |
|---|---|---|---|
| 2,742,496 A | 4/1956 | Lum et al. | |
| 3,875,120 A | 4/1975 | Brinkmann et al. | |
| 4,205,159 A | 5/1980 | Meyer et al. | |
| 4,219,636 A | 8/1980 | Nielinger et al. | |
| 4,345,066 A | 8/1982 | Rüter | |
| 4,666,627 A | 5/1987 | Meyer | |
| 4,731,421 A | 3/1988 | Hoppe et al. | |
| 4,847,356 A | 7/1989 | Hoppe et al. | |
| 4,898,896 A | 2/1990 | Maj et al. | |
| 5,360,891 A | 11/1994 | Wenzel et al. | |
| 5,416,172 A | 5/1995 | Blondel et al. | |
| 5,512,620 A | 4/1996 | van Hout et al. | |
| 5,580,913 A | 12/1996 | Mumcu et al. | |
| 5,684,120 A | 11/1997 | Torre | |
| 5,696,202 A | 12/1997 | Torre | |
| 6,204,355 B1 | 3/2001 | Torre et al. | |
| 2001/0031805 A1 | 10/2001 | Buhler | |
| 2002/0037972 A1 | 3/2002 | Maul et al. | |
| 2002/0115757 A1 | 8/2002 | Murschall et al. | |
| 2003/0021917 A1* | 1/2003 | Hotaka et al. ........... 428/29 |
| 2003/0130390 A1 | 7/2003 | Gomy et al. | |
| 2004/0158028 A1 | 8/2004 | Bühler | |

FOREIGN PATENT DOCUMENTS

| | | |
|---|---|---|
| CH | 391 290 | 8/1965 |
| CH | 480 381 | 12/1969 |
| CH | 679 861 | 4/1992 |
| DE | 2 225 938 | 12/1973 |
| DE | 26 42 244 | 3/1977 |
| DE | 27 32 928 | 2/1979 |
| DE | 27 43 515 | 4/1979 |
| DE | 29 36 759 | 4/1981 |
| DE | 36 00 015 A1 | 7/1986 |
| DE | 37 17 928 | 5/1988 |
| DE | 43 01 808 | 7/1994 |
| DE | 43 10 970 | 10/1994 |
| DE | 196 42 885 | 4/1998 |
| DE | 102 14 937 A1 | 10/2003 |
| EP | 0 053 876 | 6/1982 |
| EP | 0 136 259 | 4/1985 |
| EP | 0 271 308 | 6/1988 |
| EP | 0 313 436 | 4/1989 |
| EP | 0 550 308 A1 | 7/1993 |
| EP | 0 643 039 A1 | 3/1995 |
| EP | 0 680 996 | 11/1995 |
| EP | 0 725 100 | 8/1996 |
| EP | 0 725 101 | 8/1996 |
| EP | 1 120 443 | 8/2001 |
| EP | 1 125 968 | 8/2001 |
| GB | 1 298 016 | 11/1972 |
| GB | 1 548 431 | 7/1979 |
| GB | 2 197 332 | 5/1988 |
| WO | WO 01/92395 | 12/2001 |
| WO | WO 02/090421 | 11/2002 |
| WO | WO 02/090421 A2 | 11/2002 |
| WO | WO 03/084960 A1 | 10/2003 |

OTHER PUBLICATIONS

Deutsche Normen, DIN 6174, pp. 1-3, "Farbmetrische Bestimmung von Farbabständen bei Körperfarben Nach der Cielab-Formel", Jan. 1979.

ASTM International, Designation: D 1003-00, pp. 1-6, "Standard Test Method for Haze and Luminous Transmittance of Transparent Platics".

(Continued)

Primary Examiner—Ana Woodward
(74) Attorney, Agent, or Firm—Oblon, Spivak, McClelland, Maier & Neustadt, P.C.

(57) ABSTRACT

A molding composition which is composed of at least 60% by weight of transparent polyamide, where the molding composition comprises an effective amount of one or more optical brighteners, and where the amount of the optical brightener has been judged in such a way that a) the b value, which is a measure of yellowness, is at most 7, and moreover b) between 370 and 430 nm, at least in a lower part of the range, the transmittance is smaller than 1%, measured at a layer thickness of 4 mm, can be processed to give products which are substantially impermeable to UV light.

20 Claims, 4 Drawing Sheets

OTHER PUBLICATIONS

DIN 53 236, pp. 92-95, "MEβ- Und Auswertebedingungen zur Bestimmung von Farbunterschieden bei Anstrichen, Ähnlichen Beschichtungen und Kunststoffen", Jan. 1983.

Clarlant LTD, 'Online!, http://www.paper.clariant.com/tlp/TC_PROD.nsf/0/c86fe51809621c51c125695200329fa5/$FILE/Hostalux%20KS%20p_d.pdf, XP-002288763, pp. 1-3, "Hostalux KS Technische Mitteilung".

DIN 6174, Jan. 1979.

Ullmann's Encyclopedia of Industrial Chemistry, 5th Edition, vol. A18, 1991, "Optical Brigteners," pp. 153-176.

Data Sheet for Macrolex® Fluorescent Yellow 10GN, Feb. 2005.

Data Sheet for Macrolex® Fluorescent Red G, Feb. 2005.

* cited by examiner

TRANSPARENT MOLDING COMPOSITION FOR OPTICAL APPLICATIONS

BACKGROUND OF THE INVENTION

1. Field of the Invention

The invention relates to a molding composition based on a transparent polyamide for optical applications, the molding composition having a low level of intrinsic color together with a UV cut-off at about 400 nm. The invention further relates to the moldings produced from this molding composition.

2. Discussion of the Background

Transparent polyamides are used alongside other plastics, such as polycarbonate (PC) and polymethyl methacrylate (PMMA) as materials for producing spectacle frames, spectacle lenses, other lenses, magnifying glasses, sunglasses, and also for visors, protective masks, inspection windows, and protective screens. Amorphous polyamides are suitable for this purpose and are naturally transparent; polyamide materials which are transparent but microcrystalline have even better suitability, because when comparison is made with completely amorphous transparent polyamides, or else with PC or PMMA, they have increased scratch resistance and abrasion resistance, and also better chemicals resistance and stress cracking resistance resulting from the crystalline fraction.

In the case of optical applications such as the use of the transparent polyamides as lenses for sunglasses, the object is to inhibit the passage of UV light through the lens in order to avoid damage to the eye by light of these wavelengths. It is usual to attempt to achieve this object by introducing what are known as UV absorbers or UV stabilizers, and this also applies to transparent polyamide molding compositions.

For example, DE 196 42 885 A1 and U.S. Pat. No. 6,204,355 B1 mention the addition of UV stabilizers to transparent polyamide molding compositions. In these instances, however, the desired action of protecting the polymer appears to take precedence.

WO 02 090 421 A1 describes transparent thermoplastic polyamide molding compositions to which UV absorbers or UV stabilizers may be added in order to exclude UV light below 400 nm.

DE 37 17 928 A1 describes transparent polyamide molding compositions which may comprise optical brighteners, besides other ingredients. However, that specification does not say that the optical brightener is used to achieve a UV cut-off in the range from 370 to 430 nm.

UV cut-off here means that transmittance is less than 1% at a certain wavelength, the gradient of the transmittance curve at that point being positive. Once that point has been passed, the transmittance curve rises sharply.

The flank region of the UV/visible absorption spectra of the compounds used as UV absorbers or UV stabilizers exhibits a finite gradient. This means that there is no sudden fall-off of absorption from very high values to the value zero. If the corresponding transmittance curve is considered, this circumstance results in an S-shaped curve which rises with a finite gradient in the transition region between the value zero and the substance-specific maximum at a prescribed layer thickness. If the requirement is then to achieve exclusion of wavelengths below 400 nm in a transparent polyamide molding composition, using a commercially available UV absorber or UV stabilizer, the inevitable absorption of this compound at wavelengths above 400 nm results in marked yellowness of the molding composition. This is disadvantageous for the desired application. In the application in the lenses of sunglasses, for example, limitations arise with respect to the production of lenses with only slight tinting. Lenses with only slight tinting are advantageous in some applications, and increase the design freedom available to designers of sunglasses. In the case of slight tinting, a marked yellow perceived color of the molding composition remains discernable, and is unattractive. Any further addition of colorants in order to suppress this perceived color runs contrary to the initial objective of only slight tinting. In addition, a relatively high concentration of some colorants can bring about a loss of transparency.

If, in order to avoid these disadvantages, the UV absorber selected comprises one which, at the same concentration in the molding composition, has significant transmittance even at relatively low wavelengths, e.g. at 380 nm, it is sometimes possible to obtain a low-yellowness molding composition, but the UV protection then provided is inadequate.

Another factor which has to be considered is that the position of the transmittance curve for a molding composition is affected by the concentration of the absorber present. For example, addition of a relatively small amount of the same absorber generally leads to a shift of the cut-off toward smaller wavelengths, usually resulting in better color. However, the protective action provided is then also less than complete.

Yellowness can also result from thermo-oxidative degradation of the polymer.

As a measure of yellowness, use is made of what is known as the b value, which derives from the CIELAB color system (DIN 6174). A reduction in this b value within the positive range of values of b means a reduction in yellowness. Blueness occurs if the b value becomes negative.

It was therefore an object to provide a molding composition which better combines the property of exclusion of UV light with a minimum b value, this being a measure of yellowness of the molding composition, thus being superior to the molding compositions known hitherto in the simultaneous compliance with both criteria.

SUMMARY OF THE INVENTION

Surprisingly, this object was achieved by way of a molding composition composed of at least 60% by weight of transparent polyamide, where the molding composition comprises an effective amount of one or more optical brighteners, and where the amount of the optical brightener has been judged in such a way that a) the b value, which is a measure of yellowness, is at most 7, preferably at most 6, particularly preferably at most 5, with particular preference at most 4, and very particularly preferably at most 3 and moreover b) between 370 and 430 nm, at least in a lower part of the range, the transmittance is smaller than 1%, measured at a layer thickness of 4 mm, particularly preferably 2 mm, and very particularly preferably 1 mm.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Transparent polyamides are known (Kunststoffhandbuch [Plastics Handbook] 3/4, eds. G. W. Becker and G. Braun, pp. 803 seq. Carl Hanser Verlag Munich, Vienna, 1998). Examples of suitable transparent polyamides for the purposes of the invention are also described in the following specifications: U.S. Pat. No. 2,742,496, CH-B-480 381, CH-B-679 861, DE-A-22 25 938, DE-A-26 42 244, DE-A-27 43 515, DE-A-29 36 759, DE-A-27 32 928, DE-A-37 17 928, DE-A-43 10 970, EP-A-0 053 876, EP-A-0 271 308, EP-A-0 313 436, EP-A-0 725 100, EP-A-0 725 101, and WO 02/090421.

The transparent polyamides used according to the invention, which also may take the form of copolyamides, are prepared, by way of example, from the following monomers:

branched or linear aliphatic diamines having from 6 to 14 carbon atoms, e.g. 1,6-hexamethylenediamine, 2-methyl-1,5-diaminopentane, 2,2,4- or 2,4,4-trimethylhexamethylenediamine, 1,9-nonamethylenediamine, 1,10-decamethylenediamine, or 1,12-dodecamethylenediamine;

cycloaliphatic diamines having from 6 to 22 carbon atoms, e.g. 4,4'-diaminodicyclohexylmethane, 3,3'-dimethyl-4,4'-diaminodicyclohexylmethane, 4,4'-di-aminodicyclohexylpropane, 1,4-diaminocyclohexane, 1,4-bis(aminomethyl)cyclohexane, 2,6-bis(aminomethyl)norbornane, or 3-aminomethyl-3,5,5-trimethylcyclohexylamine;

araliphatic diamines having from 8 to 22 carbon atoms, e.g. m- or p-xylylenediamine or bis(4-aminophenyl)propane;

branched or linear aliphatic dicarboxylic acids having from 6 to 22 carbon atoms, e.g. adipic acid, 2,2,4- or 2,4,4-trimethyladipic acid, azelaic acid, sebacic acid, or 1,12-dodecanedioic acid;

cycloaliphatic dicarboxylic acids having from 6 to 22 carbon atoms, e.g. cyclohexane-1,4-dicarboxylic acid, 4,4'-dicarboxydicyclohexylmethane, 3,3'-dimethyl-4,4'-dicarboxydicyclohexylmethane, 4,4'-dicarboxydicyclohexylpropane, and 1,4-bis(carboxymethyl)cyclohexane;

araliphatic dicarboxylic acids having from 8 to 22 carbon atoms, e.g. 4,4'-diphenylmethanedicarboxylic acid;

aromatic dicarboxylic acids having from 8 to 22 carbon atoms, e.g. isophthalic acid, tributylisophthalic acid, terephthalic acid, 1,4-, 1,5-, 2,6- or 2,7-naphthalenedicarboxylic acid, diphenic acid, or diphenyl ether-4,4'-dicarboxylic acid;

lactams having from 6 to 12 carbon atoms and the corresponding ω-aminocarboxylic acids, e.g. ε-caprolactam, ε-aminocaproic acid, capryllactam, ω-aminocaprylic acid, ω-aminoundecanoic acid, laurolactam, or ω-aminododecanoic acid.

Examples of transparent polyamides which may be used according to the invention are:

the polyamide composed of terephthalic acid and of the isomer mixture composed of 2,2,4- and 2,4,4-trimethylhexamethylenediamine, the polyamide composed of isophthalic acid and of 1,6-hexamethylenediamine, the copolyamide composed of a mixture composed of terephthalic acid/isophthalic acid and of 1,6-hexamethylenediamine, the copolyamide composed of isophthalic acid, of 3,3'-dimethyl-4,4'-diaminodicyclohexylmethane, and of laurolactam or caprolactam, the (co)polyamide composed of 1,12-dodecanedioic acid or 1,10-decanedioic acid, of 3,3'-dimethyl-4,4'-diaminodicyclohexylmethane, and, where appropriate, of laurolactam or caprolactam, the copolyamide composed of isophthalic acid, 4,4'-diaminodicyclohexylmethane, and of laurolactam or caprolactam, the polyamide composed of 1,12-dodecanedioic acid and of 4,4'-diaminodicyclohexylmethane, the copolyamide composed of a terephthalic acid/isophthalic acid mixture, of 3,3'-dimethyl-4,4'-diaminodicyclohexylmethane and of laurolactam.

For the purposes of the invention, the transparent polyamide may also be a blend of two or more different polyamides. One or more components of the blend here may also be crystalline. The decisive factor is merely that the blend per se is transparent.

The principle of action of optical brighteners differs from that of UV absorbers and UV stabilizers because the energy absorbed by them in the form of radiation in the UV region is re-emitted in the form of longer-wavelength radiation, predominantly in the visible region, instead of being converted into heat. The light emitted by the brightener is mainly in the blue region of the visible spectrum, thus permitting compensation for any yellow tinge, producing a white effect, often with a bluish undertone. This property has resulted in long-standing use of compounds of this type, preferably in fiber applications in the textile industry, but also in other sectors. The systems involved here are non-transparent. In this instance, the optical brightener is used in combination with UV absorbers and UV stabilizers, white pigments, such as $TiO_2$, bluing agents, etc., the optical brightener here being intended to bring about an improvement in the color of the system, but not to exclude UV light. This type of use is described in EP 1 125 968 A1. Optical brighteners are also used in transparent molding compositions, inter alia for polycarbonate molding compositions.

WO 01/92395 A1 (U.S. 2003/0130390A1), by way of example, shows that the optical brightener is used for color improvement alongside a UV absorber. Another corresponding use of an optical brightener is found in EP 0 680 996 A1 (U.S. Pat. No. 5,512,620). However, the specific application of optical brighteners in molding compositions for blocking the passage of UV light with simultaneous achievement of a greatly improved yellowness index is hitherto unknown.

Optical brighteners are commercially available, by way of example, with the product names Uvitex (Ciba) or Hostalux (Clariant), examples in this case being Hostalux KS, Hostalux KS1, Hostalux KSB(new), or Hostalux KS1B, and are based on a series of different chemical parent structures, all of which, however, exhibit the fluorescence phenomenon described above. Examples of parent structures are stilbenes (inter alia Uvitex OB-ONE from Ciba) or thiophenes (inter alia Uvitex OB from Ciba), in each case with benzoxazole substituents, bisbenzoxazoles, and also compounds from the biphenyls class (inter alia Uvitex FP from Ciba), coumarins, and others. Further details are given in Ullmann's Encyclopedia of Industrial Chemistry, 5th edition, vol A18, VCH Verlagsgesellschaft Weinheim 1991, pp. 153–176.

The amount to be used of the optical brightener may be determined by a simple trial. For use in polyamides, the producer of Hostalux KS optical brighteners (Clariant) recommends, by way of example, a maximum added amount of 250 ppm in the polymer. With added amounts of this type, the UV cut-off property is no longer discernable at 400 nm. If the amount added is increased by a factor of from 10 to 100, an appropriate cut-off is visible for transparent polyamides. This results from the steepness of the transmittance curve for the relevant molding compositions in the transition region. In the case of other optical brighteners, the desired effect can naturally also arise in an ideal manner at other concentrations of the optical brightener in the molding composition, as a result of the specific properties of the optical brightener substances. The desired effect is likely to occur in the range from 0.00001 to 10% by weight. Mixtures of various optical brighteners may, of course, also be used.

The b value is measured to DIN 53 236 on injection-molded plaques of thickness 4 mm in incident light against, as background, a white standard complying with the norm.

Transmittance is determined to ASTM D1 003 on injection-molded plaques.

A conventional UV absorber or conventional UV stabilizer may also be present alongside the optical brightener in the molding composition, even if this embodiment is less preferred. However, the selected concentration of the UV absorber then is such that its presence alone does not cause the desired UV-protective effect. These UV absorbers may have a series of chemical parent structures, those usual being, by way of example, benzotriazoles, triazines, benzophenones, oxalanilides, cyanacrylates, benzoxazinones, and others.

An improvement, i.e. a reduction in the b value of the molding composition, this value being utilized as a measure of the yellowness of the polymer, may result, with retention of the UV-protective effect, from use of an optical brightener in combination with a suitable stabilizer or suitable stabilizer mixtures, for example antioxidants, these functioning as processing stabilizers. Mention should be made in particular of: phosphorus-containing antioxidants, compounds from the class of the sterically hindered phenols and compounds which contain sulfur in a low oxidation state. The addition of HALS stabilizers, which are also referred to as UV stabilizers, is particularly advantageous, although the mechanism of action here is different. It is based on chemical scavenging of free radicals which arise from the action of UV light on the polymer, the HALS stabilizer being consumed in the reaction. By way of example, compounds of this type are available with the trade names Uvinol 4049 H, Uvinol 4050H (BASF), Cyasorb 3853, Cyasorb 3346 (Cytec), Tinuvin 770 or Tinuvin 622 (Ciba). Stabilization of the molding composition with one or more antioxidants and/or HALS compounds does not only increase the stability of the molding composition during processing but also in particular increases the duration of the functional capability of the molding composition for the purposes of the invention. For details reference may be made to Ullmann's Encyclopedia of Industrial Chemistry, 5th edition, volume A20, VCH Verlagsgesellschaft Weinheim 1992, pp. 459–475.

Other additives which may be present by way of example in the molding composition are the following:

other polymers, e.g. polymeric flow promoters, e.g. those disclosed in EP 1 120 443 A2, polymeric flame retardants or impact modifiers, such as isorefractive grafted core-shell polymers;

fillers or reinforcing materials, e.g. isorefractive glass fibers or glass beads, or else nano-scale inorganic materials;

pigments, other colorants, plasticizers, antistatic agents, mold-release agents, flow agents, flame retardants, and the like.

The amount of all of the additives in addition to the mixture composed of polyamide and of optical brightener is preferably at most 30% by weight, based on the molding composition, particularly preferably at most 20% by weight, and very particularly preferably at most 10% by weight.

The molding composition may be prepared, by way of example, via compounding of the brighteners and additives into the material in a twin-screw extruder or other technical devices for incorporation of solids within polymer melts by mixing, or via feeding of the additive in devices serving for the preparation of polymer melts. These brighteners and additives may be undiluted when added, or may be added in the form of a masterbatch.

It is moreover possible to add the appropriate constituents into the polycondensation reactor during, prior to, or else after the polycondensation process or to vessels situated upstream thereof and used for melting or mixing. It is also possible to mix the additives with monomers, water, or solvents before these materials pass into the polycondensation process. Addition into the melt deriving from the polycondensation process and emerging from the reaction apparatus is also possible, and in this case use may be made, by way of example, of a downstream extension extruder.

Another possibility for incorporating optical brighteners and stabilizers is provided by the solid phase, as in DE 43 01 808 A.

The inventive addition of materials to the polyamide molding composition permits, for the first time, the cut-off wavelength to be set at values above 400 nm, while the color value b remains below 7. This provides an additional safety gap with respect to damaging wavelengths. The position of the cut-off may be controlled as required by the application via the nature and amount of the added optical brightener. The cut-off is generally in an application-relevant range from about 370 to 430 nm.

Appropriate molding compositions with the features a) and, where appropriate, b) given above are used to produce optical products which likewise are provided by the invention. Optical products are those through which light passes either in bundled or unbundled form and then, on the output side, is perceived by the eye. By way of example, these are optical lenses for spectacles, and in particular sunglasses, cameras, binoculars, magnifying glasses, microscopes, electro-optical measuring and testing devices, optical filters, lamp or headlamp lenses, lenses for computer- or video-linked or other projectors, viewing windows, inspection glasses, protective screens, protective visors, sun screen roofs, and glazing in the housing or automotive sector. It is also possible to produce transparent moldings, fibers, or foils for a wide variety of applications, including other applications, such as packaging for food or drink, pharmaceutical packaging, cosmetics packaging, or agricultural sheeting. The moldings are produced by the conventional methods of plastics processing, for example by injection molding or extrusion.

The molding composition of the invention may also be applied as a transparent coating to optical products of any desired constitution. It is also possible to produce a foil which comprises an optical brightener, and which is then, for example, in-mold coated in an injection mold, thus obtaining a lens or a transparent molding.

In an embodiment of this invention, the optical brightener, or a mixture of various optical brighteners, may also be applied as a constituent of a differently-constituted coating, for example of a lacquer, to the optical product composed of a transparent polyamide molding composition.

For the purposes of the invention, it is preferable that between 370 and 430 nm, at least in a lower part of the range, the transmittance of the molding is at most 10%, particularly preferably at most 6%, or at most 5%, 4%, 3%, 2%, or 1%, at the given layer thickness.

Having generally described this invention, a further understanding can be obtained by reference to certain specific examples which are provided herein for purposes of illustration only and are not intended to be limiting unless otherwise specified.

EXAMPLES 1 TO 7 AND COMPARATIVE EXAMPLES 1 TO 5

1. Preparation of the Molding Compositions:

TROGAMID® CX7323 (Degussa AG) was used as starting material to prepare the transparent polyamide molding compositions. The water content of the pellets was less than 0.1% by weight.

The following substances were used as additives:
A: Hostalux® KSp, a benzoxazole derivative (optical brightener)
B: Hostalux® KSBp, a mixture of benzoxazole derivatives (optical brightener)
C: Hostalux® KS1p, a benzoxazole derivative (optical brightener)
D: Hostalux® KS1Bp, a benzoxazole derivative (optical brightener)
E: Irgafos® 168, a phosphite (heat stabilizer)
F: Cyasorb® 1164, a triazine derivative (UV absorber)
G: Cyasorb® 3638, a benzoxazinone derivative (UV absorber)
H: Cyasorb® 3346, (poly[6-morpholino-s-triazine-2,4-diyl][2,2,6,6-tetramethyl-4-piperidyl)imino]-hexamethylene [(2,2,6,6-tetramethyl-4-piperidyl)imino]]) (UV absorber)
J: Tinuvin® 326, a benzotriazole derivative (UV absorber)

The additives were added by way of a powder mixture composed of additive and milled CX7323; they were incorporated in a Berstorff ZE25-33D twin-screw extruder at a melt temperature of 280° C. and a rotation rate of 250 rpm. The die pressure was 40 bar. The resultant compounds were pelletized and dried in vacuo at 100° C. until the water content had reached at most 0.1% by weight. The time needed for this process was typically 12 h.

The constitution of the resultant molding compositions is given in Table 1.

2. Production of Test Specimen:

Test specimens were injection molded from the pellets obtained from the molding compositions. Rectangular plaques of dimension 60×60×2 mm and disks measuring 60×4 mm were produced. An Engel ES 240/65 injection-molding machine was used for the production process at a temperature of 280° C. and at a mold temperature of 80° C.

3. Measurements of Injection-Molded Test Specimens:

The transmittance values were measured to ASTM 1003 on a Perkin Elmer Lambda 19 machine. The regular transmittance was determined, as described in section 4.3 of ASTM 1003. To this end, the distance of the test specimens from the Ulbricht sphere input was 150 mm. Measurements were made on both of the test specimens described above.

The b value was measured to DIN 53 236 by means of a CR-310 Chroma-Meter from Minolta. The measurement geometry was as follows: Observation at 0° (d/0 method) including gloss reflection. The measurement was made under incident light against a CR-A44 (Minolta) white reflector with standard illuminant D65; the spectral sensitivity of the test specimens corresponded to the 2° standard observer. The measurements were made on the 60×4 mm disks.

The results of the measurements are given in Table 2.

Figure 1:
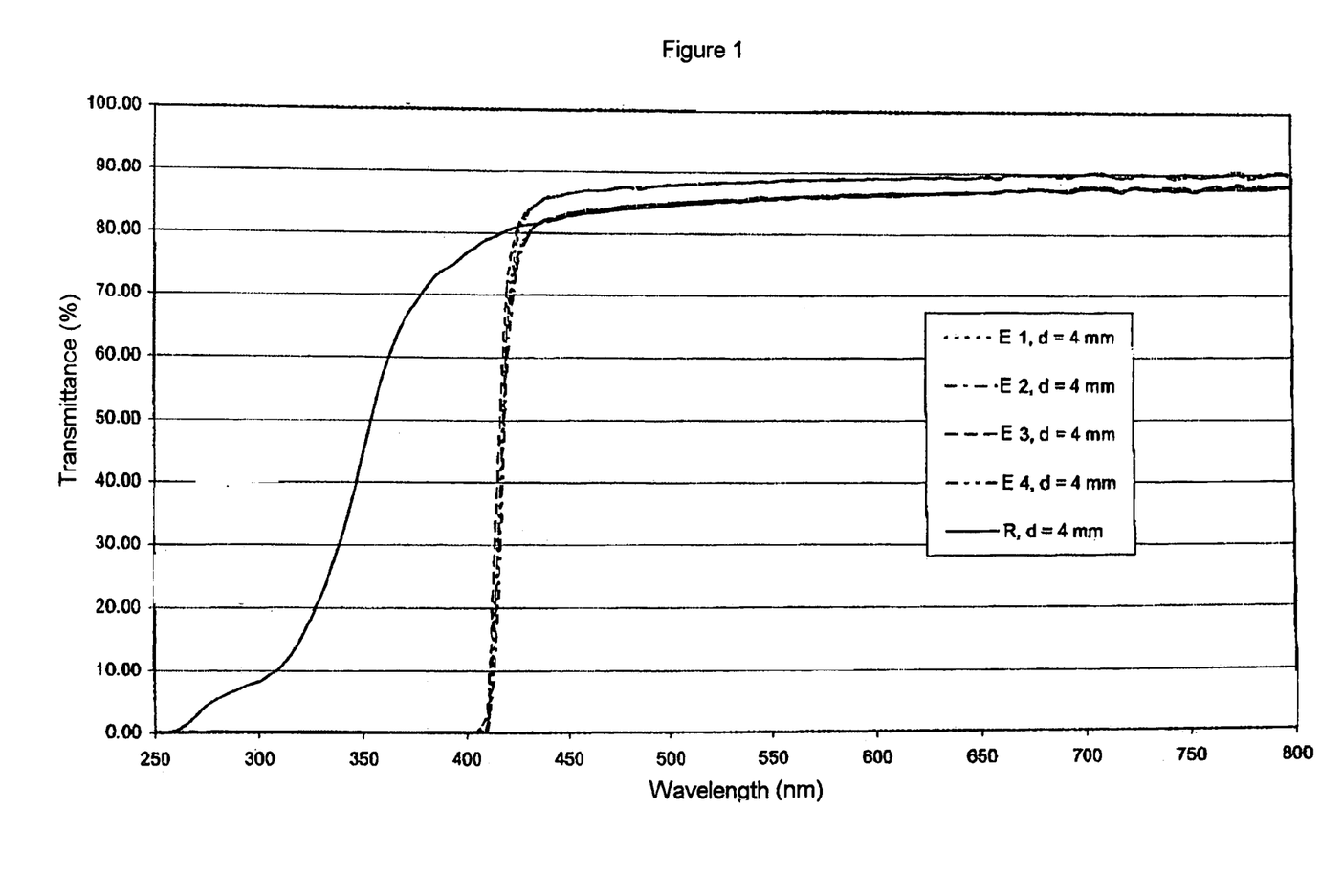
FIG. 1 compares the transmittance of the test specimens of examples 1 to 4 with the transmittance of the reference (pure CX7323)

FIG. 1 compares the transmittance of the test specimens of examples 1 to 4 with the transmittance of the reference (pure CX7323). The UV cut-off at a wavelength somewhat above 400 nm is clearly seen, in the context of a sudden rise in transmittance.

Figure 2:
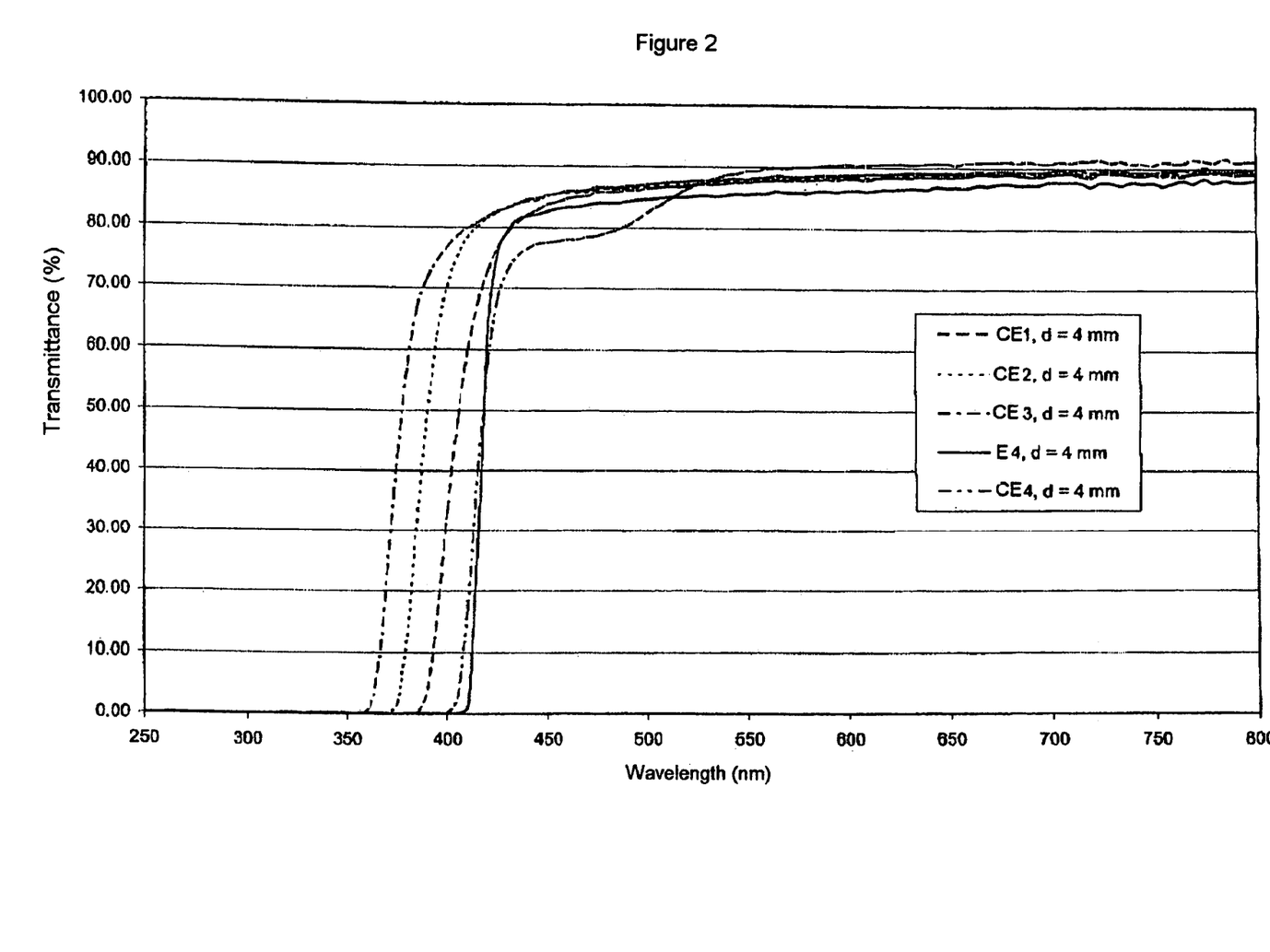
FIG. 2, illustrates the transmittance of comparative test specimens.

As seen from FIG. 2, when UV absorbers are used the result is that either the exclusion of UV light is inadequate (CE 1–3) or, where exclusion is comparable with an inventive molding composition, that the transmittance at the beginning of the visible spectrum has been reduced to the extent that a yellow color is perceived.

Figure 3:
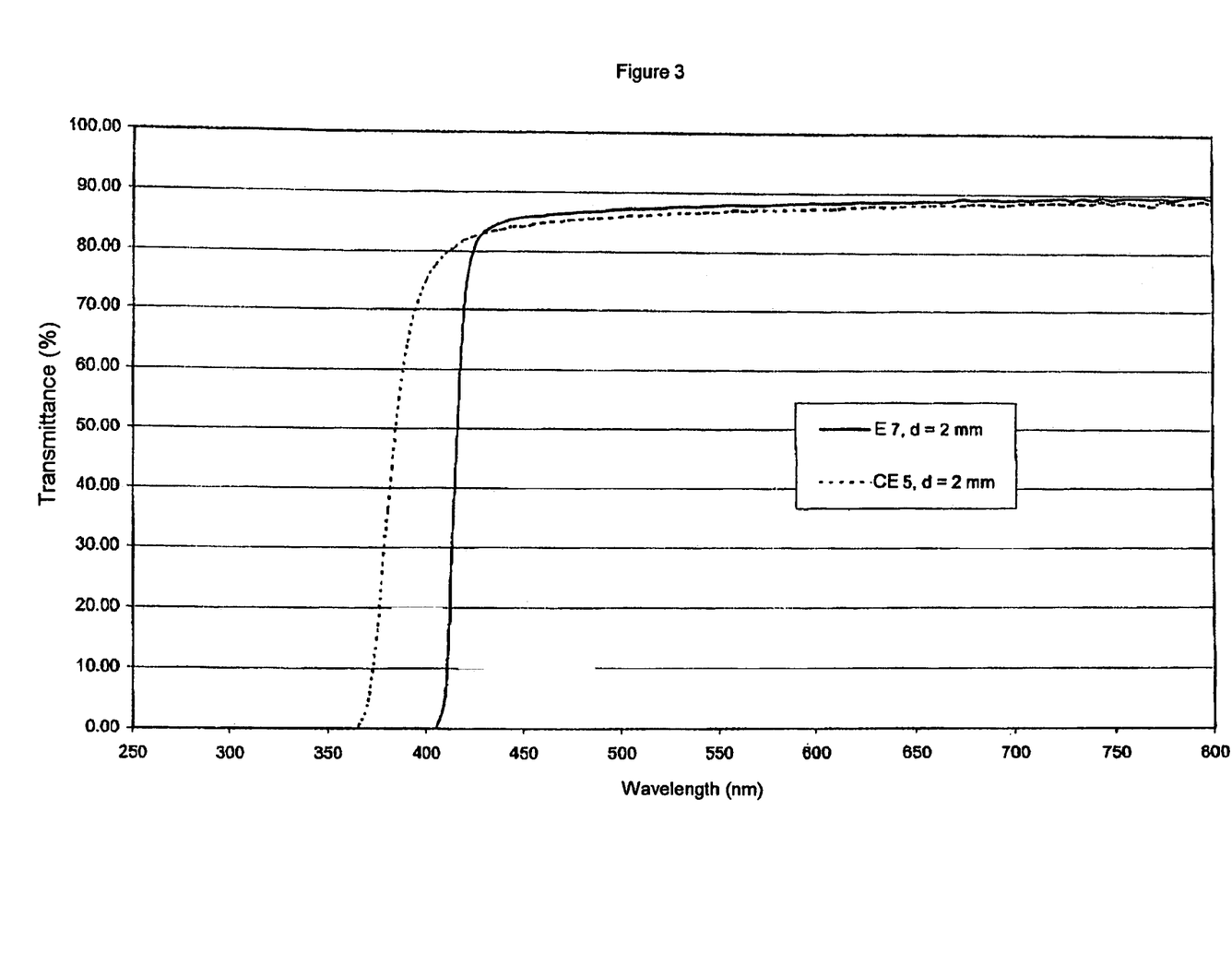
FIG. 3 compares a molding composition with UV absorber (CE 5) with a molding composition which also comprises a small amount of optical brightener (E 7)

FIG. 3 compares a molding composition with UV absorber (CE 5) with a molding composition which also comprises a small amount of optical brightener (E 7). It is clear that the use of this amount of UV absorber is in itself insufficient to give the inventive UV cut-off.

TABLE 1

Constitution of the molding compositions (in each case parts by weight)

|     | CX7323 | A    | B    | C    | D    | E   | F   | G   | H   | J   |
|-----|--------|------|------|------|------|-----|-----|-----|-----|-----|
| R   | 100    |      |      |      |      |     |     |     |     |     |
| E1  | 100    | 0.03 |      |      |      |     |     |     |     |     |
| E2  | 100    |      | 0.03 |      |      |     |     |     |     |     |
| E3  | 100    |      |      | 0.03 |      |     |     |     |     |     |
| E4  | 100    |      |      |      | 0.03 |     |     |     |     |     |
| E5  | 100    |      | 0.03 |      |      | 0.5 |     |     |     |     |
| E6  | 100    |      |      |      | 0.03 | 0.5 |     |     |     |     |
| E7  | 100    |      |      | 0.03 |      |     |     | 0.1 |     | 0.1 |
| CE1 | 99     |      |      |      |      |     | 1   |     |     |     |
| CE2 | 99.9   |      |      |      |      |     |     | 0.1 |     |     |
| CE3 | 99.9   |      |      |      |      |     |     |     | 0.1 |     |
| CE4 | 99.8   |      |      |      |      |     |     |     |     | 0.2 |
| CE5 | 100    |      |      |      |      |     |     | 0.1 |     | 0.1 |

R = Reference
B = Inventive Example
CE = Comparative Example

TABLE 2

Results of measurements

|     | b @ 4 mm | Transmittance (%) | | | |
|-----|----------|--------|--------|--------|--------|
|     |          | 380 nm | 390 nm | 400 nm | 410 nm |
| R   | 5.6      | 70.8   | 74.2   | 76.6   | 78.9   |
| E1  | 6.4      | 0.1    | 0.1    | 0.1    | 1.1    |
| E2  | 6.7      | 0.1    | 0.1    | 0.1    | 0.5    |
| E3  | 6.1      | 0.1    | 0.1    | 0.3    | 3.5    |
| E4  | 6.9      | 0.1    | 0.1    | 0.1    | 1.2    |
| E5  | 5.6      | 0.1    | 0.1    | 0.1    | 0.3    |
| E6  | 3.6      | 0.1[a] | 0.1[a] | 0.1[a] | 8.7[a] |
| E7  | 6.6      | 0.1[a] | 0.1[a] | 0.1[a] | 5.7[a] |
| CE1 | 8.3      | 0      | 4      | 33.2   | 59.9   |
| CE2 | 6        | 12.7   | 49.7   | 70.3   | 78.3   |
| CE3 | 6.2      | 57.4   | 71.6   | 76.7   | 79.8   |
| CE4 | 13.4     | 0      | 0      | 0.2    | 17     |
| CE5 | 5.7      | 38.6[a]| 49.5[a]| 53.2[a]| 71.8[a]|

[a]measured on test specimens of thickness 2 mm (all of the other measurements having been made on test specimens of thickness 4 mm)

INVENTIVE EXAMPLE 8 AND COMPARATIVE EXAMPLE 6

Production of lenses

Lenses of diameter 70 mm and thickness 2.3 mm were injection-molded from the pellets obtained from the molding compositions as in Inventive Example 5 and Comparative Example 4. An Engel ES 600 injection-molding machine was used at a melt temperature of 280° C. and a mold temperature of 80° C. An 8-lens mold was used.

Figure 4:
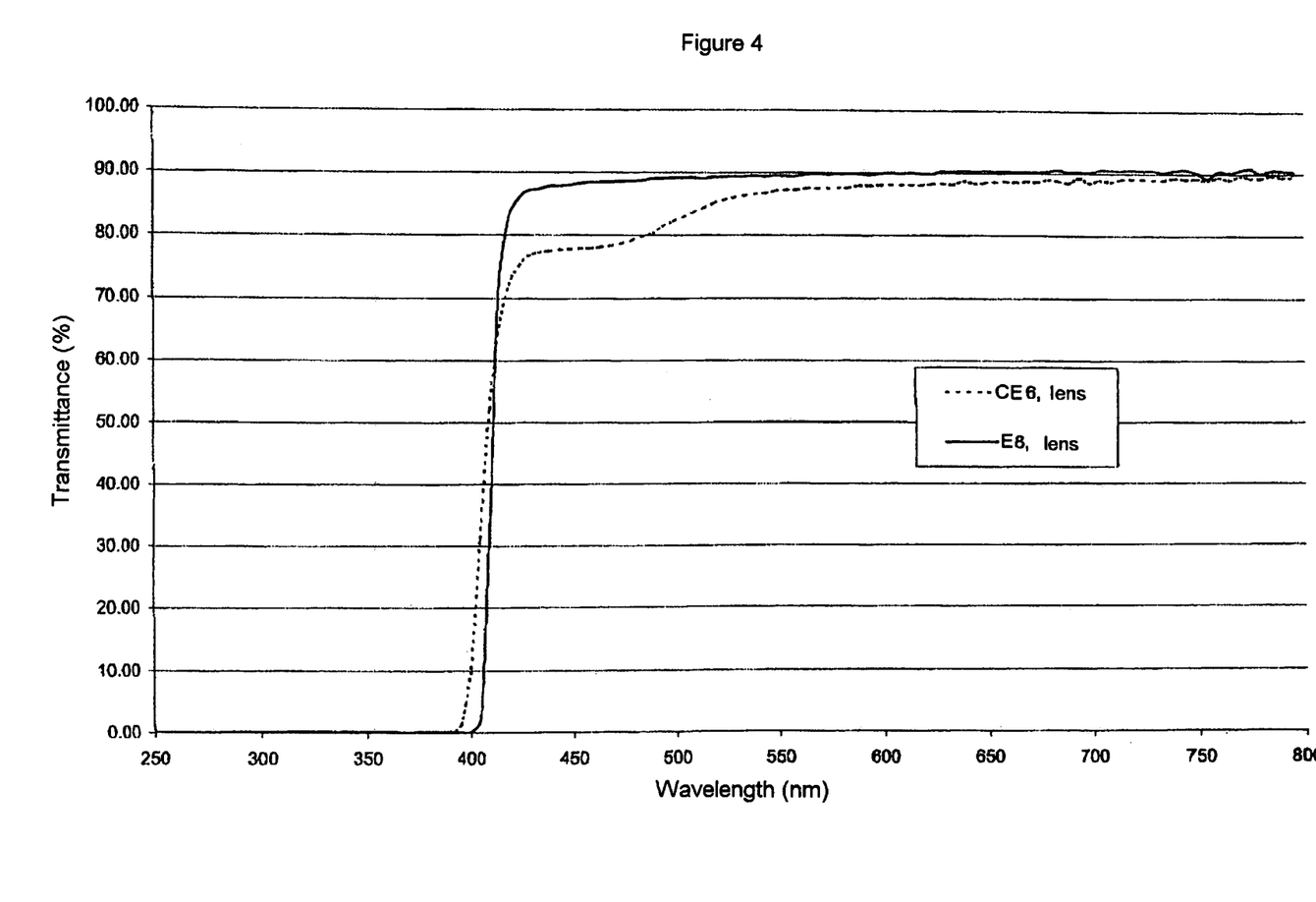
FIG. 4 compares the transmittance of a lens produced from a molding composition with a UV absorber (CE6) with a lens produced from a molding composition which contains an optical brightener (E8).

The analytical measurements on the lenses were made in a manner similar to that of a measurement made on the test specimens. The results of the measurements are given in Table 3, while FIG. 4 compares the transmittance of the lenses.

TABLE 3

Results of measurements on lenses

| | | Transmittance (%) | | | |
|---|---|---|---|---|---|
| | b @ 2.3 mm | 380 nm | 390 nm | 400 nm | 410 nm |
| E8 | 3.9 | 0.2 | 0.1 | 0.1 | 2.6 |
| CE6 | 14.3 | 0 | 0 | 1.3 | 31.2 |

Obviously, numerous modifications and variations of the present invention are possible in light of the above teachings. It is therefore to be understood that within the scope of the appended claims, the invention may be practiced otherwise than as specifically described herein.

This application is based on German patent application 10308226.3 filed in the German Patent Office on Feb. 25, 2003, the entire contents of which are hereby incorporated by reference.

What is claimed as new and desired to be secured by Letters Patent of the United States is:

1. A molding composition comprising:
   i) at least 60% by weight of transparent polyamide; and
   ii) an effective amount of one ot more optical brighteners, and where the amount of the optical brightener has been judged in such a way that
   a) the b value (DIN 53 236) is at most 7, and
   b) at a wavelength of between 370 and 430 nm, at least in a lower part of the range, the transmittance (ASTM D1003) is smaller than 1%, measured at a layer thickness of 4 mm.

2. The molding composition of claim 1, wherein said transparent polyamide is prepared from at least one monomer selected from the group consisting of branched or linear aliphatic diamines having from 6 to 14 carbon atoms, cycloaliphatic diamines having from 6 to 22 carbon atoms, araliphatic diamines having from 8 to 22 carbon atoms, branched or linear aliphatic dicarboxylic acids having from 6 to 22 carbon atoms, cycloaliphatic dicarboxylic acids having from 6 to 22 carbon atoms, araliphatic dicarboxylic acids having from 8 to 22 carbon atoms, aromatic dicarboxylic acids having from 8 to 22 carbon atoms, lactams having from 6 to 12 carbon atoms and the corresponding ω-aminocarboxylic acids.

3. The molding composition of claim 1, wherein said transparent polyamide is at least one polyamide selected from the group consisting of
   the polyamide prepared from terephthalic acid and of the isomer mixture composed of 2,2,4- and 2,4,4-trimethylhexamethylenediamine,
   the polyamide prepared from isophthalic acid and of 1,6-hexamethylenediamine,
   the copolyamide prepared from a mixture composed of terephthalic acid/isophthalic acid and of 1,6-hexamethylenediamine,
   the copolyamide prepared from isophthalic acid, of 3,3'-dimethyl-4,4'-diaminodicyclohexylmethane, and of laurolactam or caprolactam,
   the (co)polyamide prepared from 1,12-dodecanedioic acid or 1,10-decanedioic acid, of 3,3'-dimethyl-4,4'-diaminodicyclohexylmethane, and, where appropriate, of laurolactam or caprolactam,
   the copolyamide prepared from isophthalic acid, 4,4'-diaminodicyclohexylmethane, and of laurolactam or caprolactam,
   the polyamide prepared from 1,12-dodecanedioic acid and of 4,4'-diaminodicyclohexylmethane,
   the copolyamide prepared from a terephthalic acid/isophthalic acid mixture, of 3,3'-dimethyl-4,4'-diaminodicyclohexylmethane and of laurolactam.

4. The molding composition of claim 1, wherein said optical brightener has a structure selected from the group consisting of stilbenes substituted with benzoxazole, stilbenes substituted with bisbenzoxazoles, thiophenes substituted with benzoxazole, thiophenes substituted with bisbenzoxazoles, biphenyls and coumarins.

5. The molding composition of claim 1, wherein said optical brightener is present in an amount of from 0.00001 to 10% by weight.

6. The molding composition of claim 1, further comprising a UV absorber.

7. The molding composition of claim 6, wherein said UV absorber is selected from the group consisting of benzotriazoles, triazines, benzophenones, oxalanilides, cyanacrylates and benzoxazinones.

8. The molding composition of claim 1, further comprising a UV stabilizer.

9. The molding composition of claim 8 wherein said UV stabilizer is selected from the group consisting of phosphorus-containing antioxidants, sterically hindered phenols, compounds which contain sulfur in a low oxidation state and HALS stabilizers.

10. The molding composition of claim 1, wherein said composition further comprises polymeric flow promoters, polymeric flame retardants, polymeric impact modifiers, fillers, reinforcing materials pigments, plasticizers, antistatic agents, mold-release agents flow agents, flame retardants and a mixture thereof.

11. A method of inhibiting the passage of UV light through an optical product comprising adding one or more optical brighteners to a molding composition which that is comprised of at least 60% by weight of transparent polyamide, the optical brightener(s) being present in an amount such that the b value (DIN 53 236) is at most 7.

12. An optical product obtained from a molding composition comprising:
   i) at least 60% by weight of transparent polyamide; and
   ii) an effective amount of one or more optical brighteners, and where the amount of the optical brightener has been judged in such a way that the b value (DIN 53 236) is at most 7.

13. The optical product of claim 12, wherein at a wavelength of between 370 and 430 nm, at least in a lower part of the range, the transmittance (ASTM D1003) of the molding is at most 10% at the layer thickness given.

14. The optical product of claims 12 or 13, wherein said optical product is selected from the group of optical lenses for spectacles, optical lenses for cameras, spectacle lenses, sunglasses, optical lenses for binoculars, optical lenses for magnifying glasses, optical lenses for microscopes, optical lenses for electro-optical measuring devices, optical lenses for electro-optical testing devices, optical filters, lamp lenses, headlamp lenses, projector lenses for computer, video-linked projector lenses, viewing windows, inspection glasses, protective screens, protective visors, sun screen roofs, housing glazing and automotive glazing.

15. The optical product of claim 13, wherein said molding has a transmittance of at most 6% at the given thickness.

16. The optical product of claim 13, wherein said molding has a transmittance of at most 5% at the given thickness.

17. The optical product of claim 13, wherein said molding has a transmittance of at most 4% at the given thickness.

18. The optical product, of claim 12 wherein said optical product has a multilayer structure.

19. An optical product made from a transparent polyamide, comprising a coating that comprises one or more optical brighteners that has been applied to said product, the optical brightener(s) being present in an amount such that the b value (DIN 53 236) is at most 7.

20. The optical product of claim 19, wherein said coating is a lacquer.

* * * * *